July 16, 1929.  M. L. HEINEKE ET AL  1,720,956
CONVEYER FOR GRAIN WEIGHERS
Filed May 21, 1926  3 Sheets-Sheet 1

Martin L. Heineke
Henry L. Heineke
INVENTOR.

BY A. B. McCall.
ATTORNEYS.

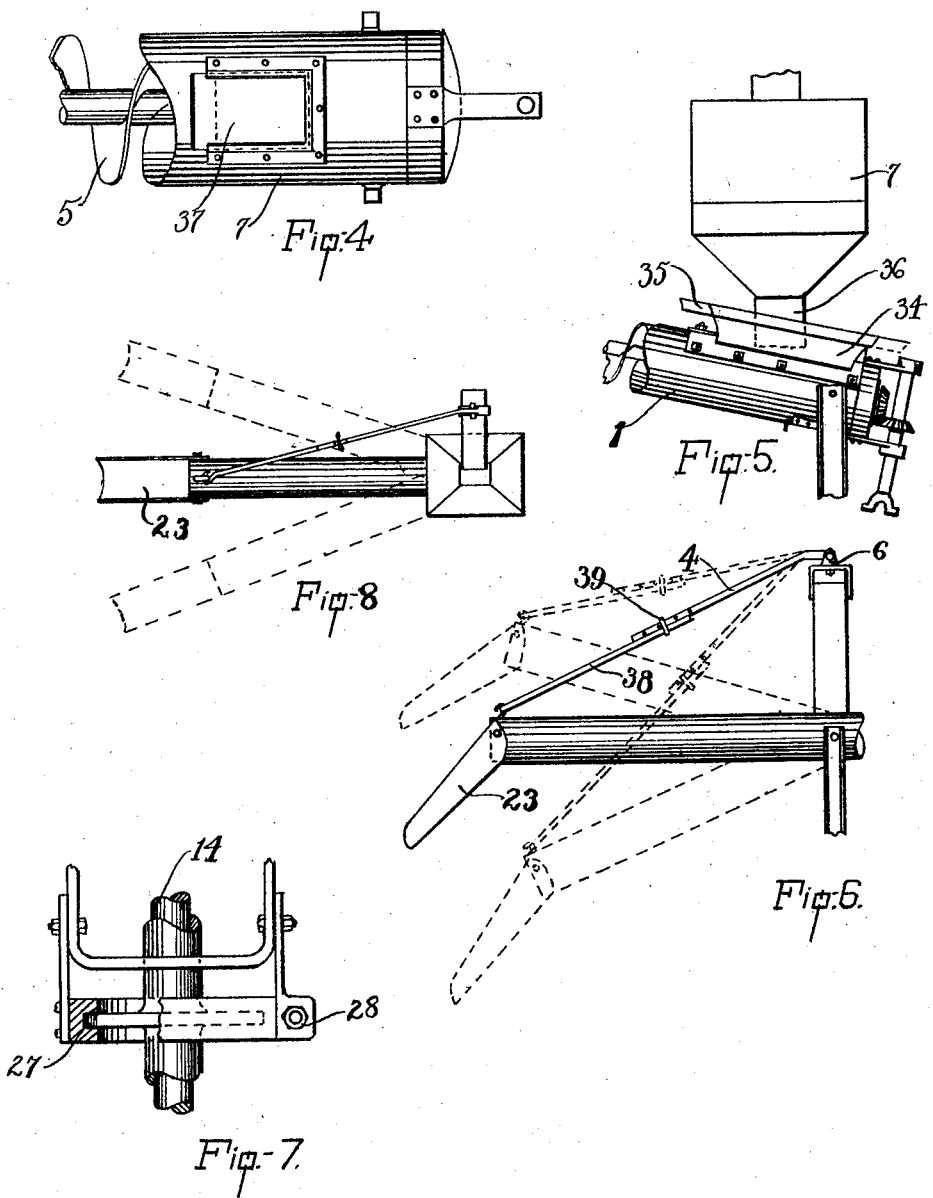

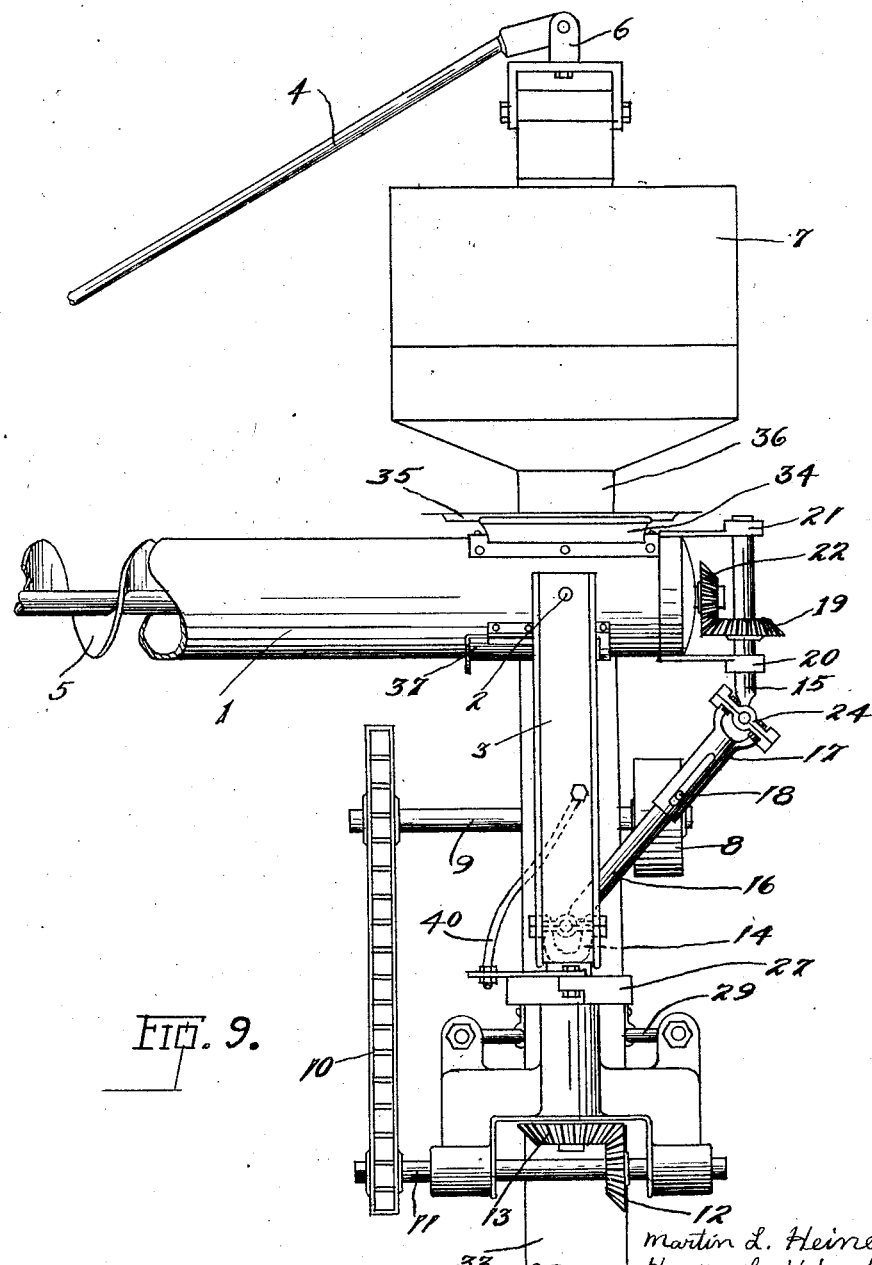

Patented July 16, 1929.

1,720,956

UNITED STATES PATENT OFFICE.

MARTIN L. HEINEKE AND HENRY L. HEINEKE, OF SPRINGFIELD, ILLINOIS.

CONVEYER FOR GRAIN WEIGHERS.

Application filed May 21, 1926. Serial No. 110,641.

Our invention relates to conveyers for grain weighers adapted to be pivotally adjusted vertically or horizontally within predetermined optional limits. An object being in this device to provide not only a conveyer for grain weighers that may be adjusted pivotally to elevate grain above horizontal from the weigher in connection with a threshing machine or to pivotally swing the conveyer tube about horizontally while in such elevated position if desired or lowered position but also to provide in such an adjustable conveyer a means of cleaning out the conveyer tube thoroughly after a threshing job is finished by providing an opening with a slidable closure member therefor within the bottom of the conveyer tube at the base thereof.

A particular object of our invention is to provide a convenient, economical and practical conveyer for grain weighers which may be pivotally adjusted horizontally and vertically as above described, while the conveyer is in normal operation in connection with the normal function of the weigher.

A further object of our invention is to provide a conveyer for grain weighers having in combination with the above mentioned conveniences, a means for completely cleaning out all grain which may not have been otherwise carried out of the conveyer into a wagon or bin during threshing operations.

We attain the objects of our invention by the device described in the annexed specification, recited in the claim and illustrated in the accompanying drawings in which like reference numerals indicate like parts in the several figures.

Referring to the figures:

Figure 4 is a detail of the clean-out member at the base of the conveyer tube and adapted to be used for thoroughly relieving the conveyer tube of all residue grain after a threshing operation.

Figure 5 is a detail of the grain receiving member of the conveyer tube showing in connection therewith an automatically, slidable cover member for the grain receiving member of the conveyer to prevent the overflow of grain when the weigher empties the grain into the conveyer.

Figure 6 is a diagram showing a group of the respective positions of vertical adjustment that may be made in the pivot mounted conveyer for grain weighers of our invention.

Figure 7 is a detail of the brake adjustment used for holding the conveyer mechanism substantially in the desired horizontal position of adjustment. Figure 8 is a diagram showing horizontal adjustment.

Figure 9 is an enlarged detail of the side view of the operating mechanism for the control of our conveyer for grain weighers.

Referring now in detail to the device of our invention, we provide a pivotally mounted conveyer tube —1— pivotally supported on a bearing —2— on a bracket —3— suspended at the end from an adjustable rod —4—. This tube is provided with a screw conveyer member adapted to be rotated within the enclosure of tube —1— for the movement of grain therethrough.

Suspension rod —4— is pivotally supported on bracket —6— which is mounted upon the elevator for grain adapted to carry grain to the weigher —7— shown but not claimed in this application.

The conveyer for grain weighers of our invention is adapted to be operatively connected with the same source of power as the grain weigher to which it is attached and a preferable arrangement for that operation is to connect a belt with pulley —8— on shaft —9— and through the normal action of chain drive —10— effect a rotation of shaft —11— which through gear —12— rotates gear —13— which turns with upright shaft —14—.

Figure 1:
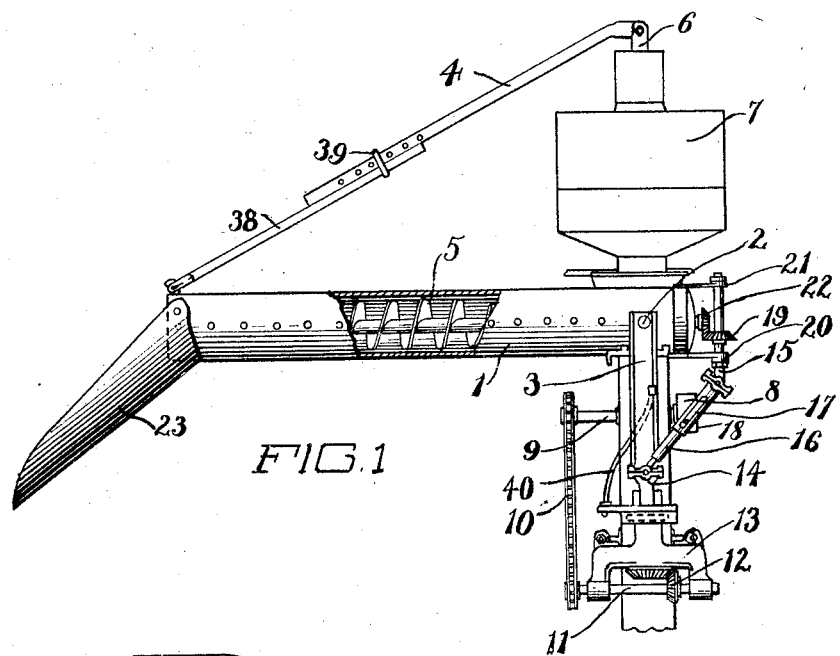
Figure 1 is a side elevation of the conveyer for grain weighers of our invention showing the pivot mounted conveyer tube adjusted in horizontal position and showing also in a cut-a-way the screw member for conveying grain through the tube.
Figure 2:
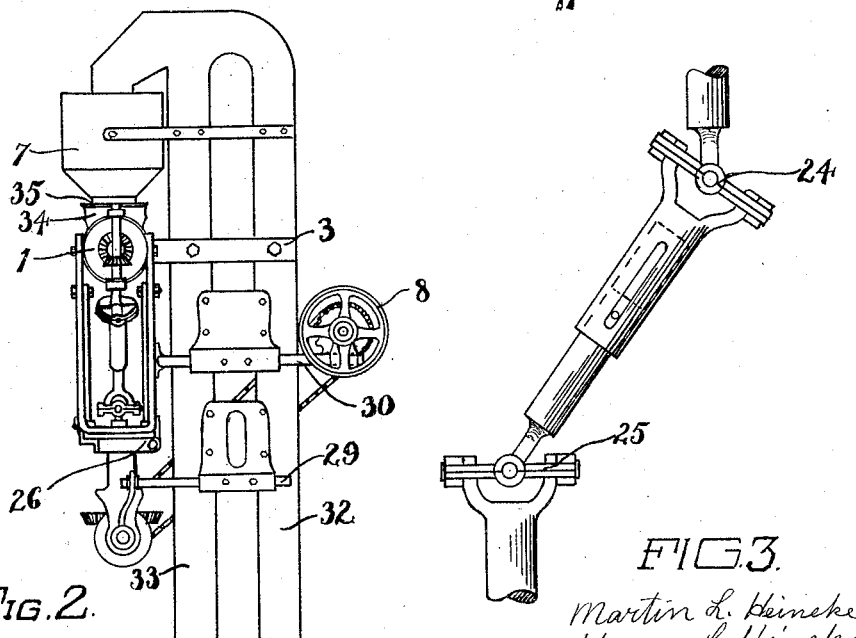
Figure 2 is an end view of the device of our invention shown mounted in its normal operative position upon the elevator members of a grain weigher.
Figure 3:
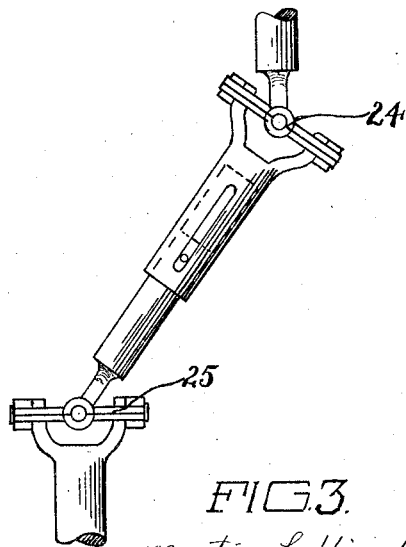
Figure 3 is a detail of a jointed drive shaft which is used with success in connection with the normal operation of the device of our invention.

By a study of Figure 1, it will be observed that grain conveyer screw —5— is controlled in its rotating movements through a novel arrangement of a joint shaft connecting shaft —15— with shaft —14—. The adjustable shaft connecting shaft —14— with shaft —15— is adapted to be telescopically adjustable and is provided with male section —16— and female section —17— which are held into longitudinal slidable alignment by a pin —18—.

The intended function of this jointed shaft is to provide simple and convenient means for enabling the operator to make vertical adjustment in conveyer tube —1— supported on pivot —2— while the grain weigher —7— and our conveyer mechanism are still running in normal operation during the threshing of grain and by this means gear —19— rotating in bearings —20— and —21— will continue to rotate gear —22— which drives screw —5— within conveyer tube —1—.

Figure 1 shows conveyer tube —1— in a horizontal position with spout —23— attached thereto; but when conveyer tube —1— is lifted to a predetermined height above horizontal adjustment, shaft —16— and —17— is telescopically shortened while rotating, if the operator pivotally elevates conveyer tube —1—; while on the other hand if the operator desires to lower conveyer tube —1— below horizontal level, the telescopically adjustable shaft —16— and —17— is automatically lengthened telescopically while rotating in normal operation.

A flexible shaft might well be used in the place of jointed shaft —16— and —17— but we have shown herewith the jointed shaft with a type of universal joint shown at —24— and —25— for the reason that it has been found that a jointed shaft of this character provides substantial connection for the purpose intended.

When the operator makes horizontal adjustment, we provide for his convenience a brake —26— operating upon a disc —27— (see Figure 7) which he tightens up substantially by tightening nut —28— on the brake band which is adapted to hold the conveyer to the desired position of horizontal adjustment.

The operating and control mechanism for our conveyer is supported on brackets —29—, —30— and —31— and secured to grain elevator members —32— and —33—.

When grain is dumped out of hopper —7— into conveyer tube —1— it falls through a receiving hopper made integral with conveyer —1— and this hopper is provided with a slidable and automatically adjustable cap —35— which is adapted to slidably move across the top of hopper —34— any time vertical adjustments are made in conveyer tube —1—. This sliding movement of cap —35— for hopper —34— is caused by having spout —36— of hopper —7— extend down through an opening in the top of cap —35— which is made slidably movable lengthwise across hopper —34— by the provision of flanges which engage the top edges of hopper —34— along its sides. This sliding cap is provided as a means to prevent grain from losing out of hopper —34— when the grain is dumped out of hopper —7—.

A novel and convenient feature of our conveyer is provided in the bottom of conveyer tube —1— at the base thereof. This novel feature is a clean out device shutter —37— acting as a closure member for an opening in the base of conveyer tube —1—; whereby after threshing operations are completed on a job the residue grain may be completely cleaned out of the conveyer tube to prevent carrying possible weedseed and other undesirable seeds from one field to another.

This clean out member is especially desirable in view of the fact that in order to get a screw member —5— to work conveniently, it must operate loosely enough in tube —1— that when rotating in a horizontal position it may leave some grain in the bottom of tube —1— at the close of a threshing job after the conveyer screw —5— has moved the last charge of grain out of the end of the tube. This grain that is left in the bottom of tube —1— may be very easily dumped out of the tube by opening shutter —37— and pivotally lifting the end of tube —1— and by reverse movement of screw —5—, the residue grain may be quickly moved down to and out of the clean out while shutter —37— is open. This reversing movement of screw —5— may be done by hand by turning a pulley —8—.

In order to substantially support tube —1— in its various positions of vertical adjustment, rod —4— is provided with an adjustable extension —38— and adapted to be held into such position of adjustment by means of clamp —39— adapted to engage rod —4—.

To those skilled in the threshing machine art, it will be evident that certain minor changes might be made in certain structural details of our device and still stay within the spirit and scope of our invention. For instance, the function of jointed shaft —16— and —17— might be taken care of by using a flexible shaft and accomplish equally as good results; and furthermore brace member —40— which is adapted to aid in the support of conveyer tube —1— by helping to hold bracket —3— against the strain incident to the adjustments in tube —1— could be made in some other suitable shape; but the preferred arrangement of details of structure is herein above described and illustrated in the accompanying drawings.

Having thus described the nature of our invention what we claim as new and useful and desire to secure by Letters Patent is:

A conveyer for grain weighers comprising in co-operative combination a conveyer tube, a pivotal mounting therefor, a conveyer screw operatively disposed within said conveyer tube and extending on both sides of said pivotal mounting; a source of driving power for said screw; and an automatically adjustable driving shaft operatively connecting said conveyer screw with said source of power at a point spaced from the pivotal mounting for the conveyer tube; whereby said conveyer may while in normal operation be adjusted horizontally or vertically within predetermined limits.

In witness whereof, we hereunto set our hands this 12th day of May, A. D. 1926.

MARTIN L. HEINEKE.
HENRY L. HEINEKE.